(12) United States Patent
Yan

(10) Patent No.: US 8,608,449 B2
(45) Date of Patent: Dec. 17, 2013

(54) SUPPORT FOR A LARGE VERTICAL AXIS WIND TURBINE

(75) Inventor: Qiang Yan, Shanghai (CN)

(73) Assignee: Qiang Yan, Shanghai (CN)

( * ) Notice: Subject to any disclaimer, the term of this patent is extended or adjusted under 35 U.S.C. 154(b) by 0 days.

(21) Appl. No.: 12/960,529

(22) Filed: Dec. 5, 2010

(65) Prior Publication Data

US 2011/0076154 A1 Mar. 31, 2011

Related U.S. Application Data

(63) Continuation of application No. PCT/CN2009/000614, filed on Jun. 1, 2009.

(30) Foreign Application Priority Data

Jun. 5, 2008 (CN) .......................... 2008 1 0108995

(51) Int. Cl.
*F03D 3/02* (2006.01)
(52) U.S. Cl.
USPC .................................. 416/244 R; 416/DIG. 6
(58) Field of Classification Search
USPC ......... 416/244 R, DIG. 6, 210 R, 211, 197 A; 415/4.2, 4.4; 52/652.1, 653.1, 653.2, 52/633
See application file for complete search history.

(56) References Cited

U.S. PATENT DOCUMENTS

| 3,119,471 | A | * | 1/1964 | Turner | 52/148 |
| 4,037,989 | A | * | 7/1977 | Huther | 416/197 A |
| 4,134,708 | A | * | 1/1979 | Brauser et al. | 415/30 |
| 4,772,894 | A | * | 9/1988 | Foissac et al. | 343/875 |
| 6,320,273 | B1 | * | 11/2001 | Nemec | 290/55 |
| D511,495 | S | * | 11/2005 | Okubo et al. | D13/115 |
| 7,726,934 | B2 | * | 6/2010 | Cowan | 415/4.2 |
| 2005/0166521 | A1 | * | 8/2005 | Silber | 52/633 |
| 2007/0014658 | A1 | * | 1/2007 | Mollinger | 415/4.2 |
| 2011/0076154 | A1 | * | 3/2011 | Yan | 416/244 R |

FOREIGN PATENT DOCUMENTS

| CN | 1183134 | A | 5/1998 |
| CN | 2699000 | Y | 5/2005 |
| CN | 1683784 | A | 10/2005 |
| CN | 2750073 | Y | 1/2006 |
| CN | 1912382 | A | 2/2007 |
| CN | 1932284 | A | 3/2007 |
| CN | 101004167 | A | 7/2007 |
| JP | 2005233015 | A | 9/2005 |
| WO | WO 9630647 | A1 | * | 10/1996 |
| WO | WO 2006111597 | A1 | * | 10/2006 |

* cited by examiner

*Primary Examiner* — Edward Look
*Assistant Examiner* — Christopher R Legendre
(74) *Attorney, Agent, or Firm* — Manni Li; Mei & Mark LLP

(57) ABSTRACT

A support for a large vertical axis wind turbine including a tower frame, a platform, a vertical central axis, and a vertical axis windmill including a plurality of blades and supporting arms. The platform is disposed on the tower frame for installing and fixing a generator. The vertical central axis and the vertical axis windmill are supported by the tower frame. The tower frame is a truss structure and includes at least three sub-tower frames which are in parallel with each other and form a regular polygon from top view. The sub-tower frames are hollow tubes. The ratio of a diameter of the vertical axis windmill to a distance between two adjacent sub-tower frames is between 2.5 and 6. The ratio of the diameter of the vertical axis windmill to a height of the tower frame is between 3 and 0.5.

8 Claims, 6 Drawing Sheets

SUPPORT FOR A LARGE VERTICAL AXIS WIND TURBINE

CROSS-REFERENCE TO RELATED APPLICATIONS

This application is a continuation of International Patent Application No. PCT/CN2009/000614 with an international filing date of Jun. 1, 2009, designating the United States, now pending, and further claims priority benefits to Chinese Patent Application No. 200810108995.8 filed Jun. 5, 2008. The contents of all of the aforementioned applications, including any intervening amendments thereto, are incorporated herein by reference.

BACKGROUND OF THE INVENTION

1. Field of the Invention

The invention relates to a support for a large vertical axis wind turbine (VAWT).

2. Description of the Related Art

In the invention, large vertical axis wind turbines refer to those with output power more than 50 kW.

Conventional supports of large vertical axis wind turbines, as shown in FIG. 1, include a platform 2 disposed on a tower frame 1 for installing and fixing wind turbines. Several parts 3, such as generators, connectors, brakes, and transmissions, are installed on the platform 2. The tower frame 1 supports a vertical central axis 4 and a vertical axis windmill consisting of blades 6 and supporting arms 5. The tower frame 1 is hollow in structure. The vertical central axis 4 is solid or thick-walled and hollow. The supporting arm 5 is hollow in structure.

Subject to multiple factors such as supports, the power of conventional VAWTs is generally low. To maintain the stability of conventional supports in strong wind (for example, at wind velocity of 60 m/s), the tower frame and vertical central axis must be made very strong. Furthermore, with the increase of the windmill diameter, the diameter of the tower frame and the vertical central axis must be increased proportionally. However, due to the limit of industrial equipment and cost, the development of larger VAWT products is affected.

For example, assuming a VAWT has a solid vertical central axis and a windmill thereof is 50 m in diameter and 40 m in height. Under a safe wind velocity of 60 m/s, the lateral wind force exerted on the windmill is approximately 2700 KN. To prevent the wind turbine from being damaged by wind at 60 m/s, the vertical central axis need be designed about 25 m in length, approx. 1.5 m in diameter, and nearly 350 t in weight. Although the strength of the supports is enough, the rigidity thereof is insufficient. Likewise, if the vertical central axis is thick-walled and hollow, it should be approx. 3.5 m in diameter and a hundred tons in weight. Moreover, the larger the diameter of the central axis, the larger the diameter of bearings, thus significantly increasing cost. For a tower frame, even it is only 25 m in height, the maximum bending moment at the bottom is approx. $1.26 \times 10^5$ KN·m, the diameter of the tower frame needs approx. 6 m or larger, weighing about 150 t. In addition, the base of the tower frame need be enlarged accordingly, thus greatly increasing the cost of large VAWTs.

SUMMARY OF THE INVENTION

In view of the above-described problems, it is one objective of the invention to provide a support for a large vertical axis wind turbine that can resist strong wind effectively and reduce production cost.

To achieve the above objective, in accordance with one embodiment of the invention, there is provided a support for a large vertical axis wind turbine comprising a tower frame, a platform, a vertical central axis, and a vertical axis windmill comprising a plurality of blades and supporting arms, wherein the platform is disposed on the tower frame for installing and fixing a generator; the vertical central axis and the vertical axis windmill are supported by the tower frame; the tower frame is a truss structure and comprises at least three sub-tower frames which are in parallel with each other and form a regular polygon from top view; the sub-tower frames are hollow tubes; a ratio of a diameter of the vertical axis windmill to a distance between two adjacent sub-tower frames is critically between 2.5 and 6; and a ratio of the diameter of the vertical axis windmill to a height of the tower frame is critically between 3 and 0.5.

In a class of this embodiment, the tower frame comprises three sub-tower frames which form a regular triangle from top view.

In a class of this embodiment, the vertical central axis is hollow and a truss structure is disposed therein.

In a class of this embodiment, the truss structure in the vertical central axis extends homogeneously from the bottom to the top.

In a class of this embodiment, the truss structure in the vertical central axis extends heterogeneously from the bottom to the top, the truss structure at the bottom with a high density and that on the top with a low density.

In a class of this embodiment, the wall of the vertical central axis is a circle comprising a plurality of round tubes at intervals.

In a class of this embodiment, the supporting arms are a truss structure.

In a class of this embodiment, a ratio of a length of the supporting arms to a space between two adjacent trusses is critically between 13 and 25.

In a class of this embodiment, a generator, connector, brake, transmission, or gear box is disposed under the platform.

Advantages of the invention are summarized below. The ratio of the diameter of the vertical axis windmill to the distance between two adjacent sub-tower frames and that of the diameter of the vertical axis windmill to the height of the tower frame is controlled proportionally, which saves material consumption and reduces production cost while satisfying the requirement for safety. The heterogeneous design of the truss structure in the vertical central axis reduces the weight of the vertical central axis, so does the circle structure of the wall of the vertical central axis. Furthermore, the support of the invention can resist strong wind and is easy for practice.

BRIEF DESCRIPTION OF THE DRAWINGS

The invention is described hereinbelow with reference to accompanying drawings, in which.

DETAILED DESCRIPTION OF THE EMBODIMENTS

For further illustrating the invention, experiments detailing a support of large VAWTs are described below. It should be noted that the following examples are intended to describe and not to limit the invention.

Example 1

Figure 1:
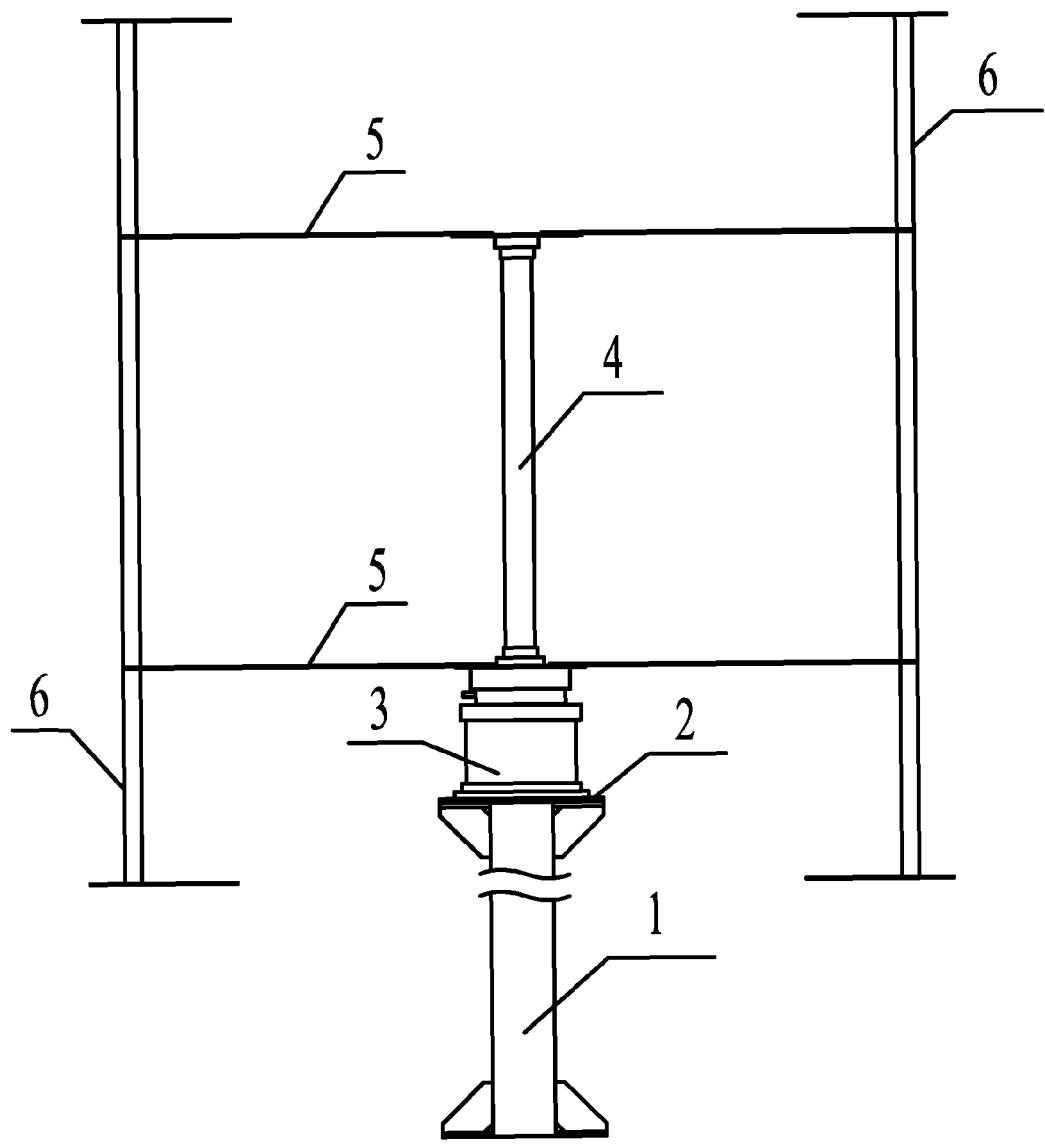
FIG. 1 shows a schematic diagram of a support of conventional VAWTs.
Figure 2:
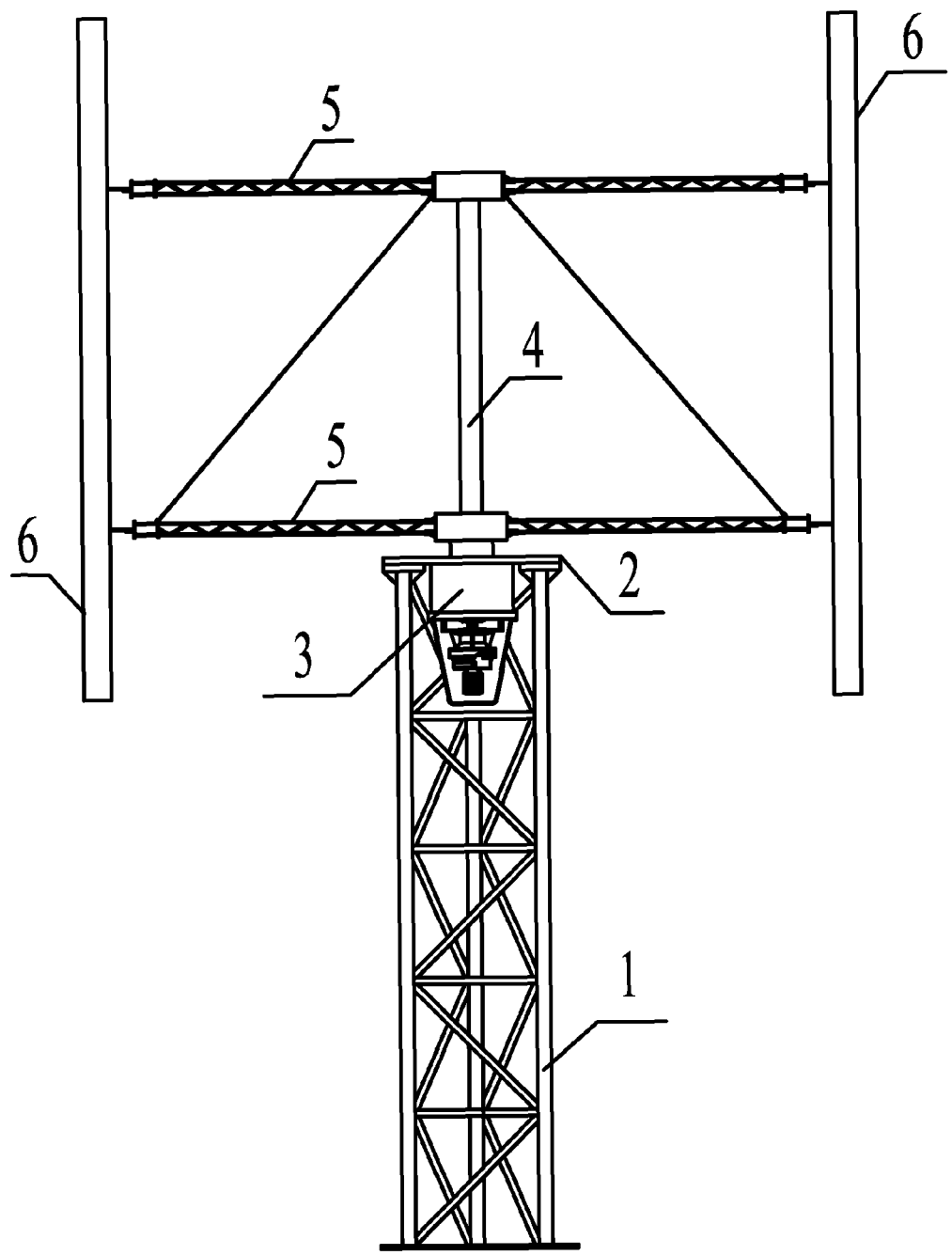
FIG. 2 shows a schematic diagram of a support for a large VAWT according to one embodiment of the invention.
Figure 3:
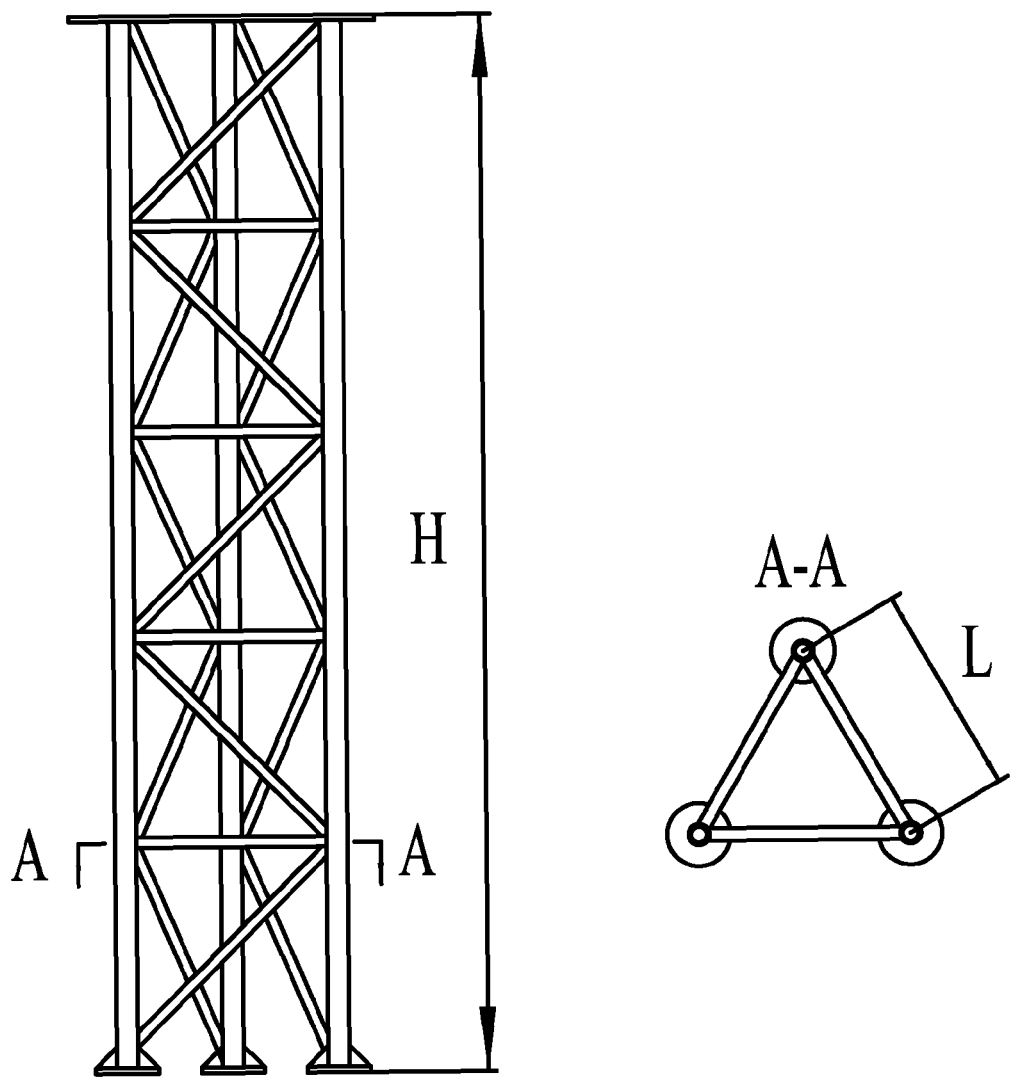
FIG. 3 shows a schematic diagram of a tower frame according to one embodiment of the invention.
Figure 4:
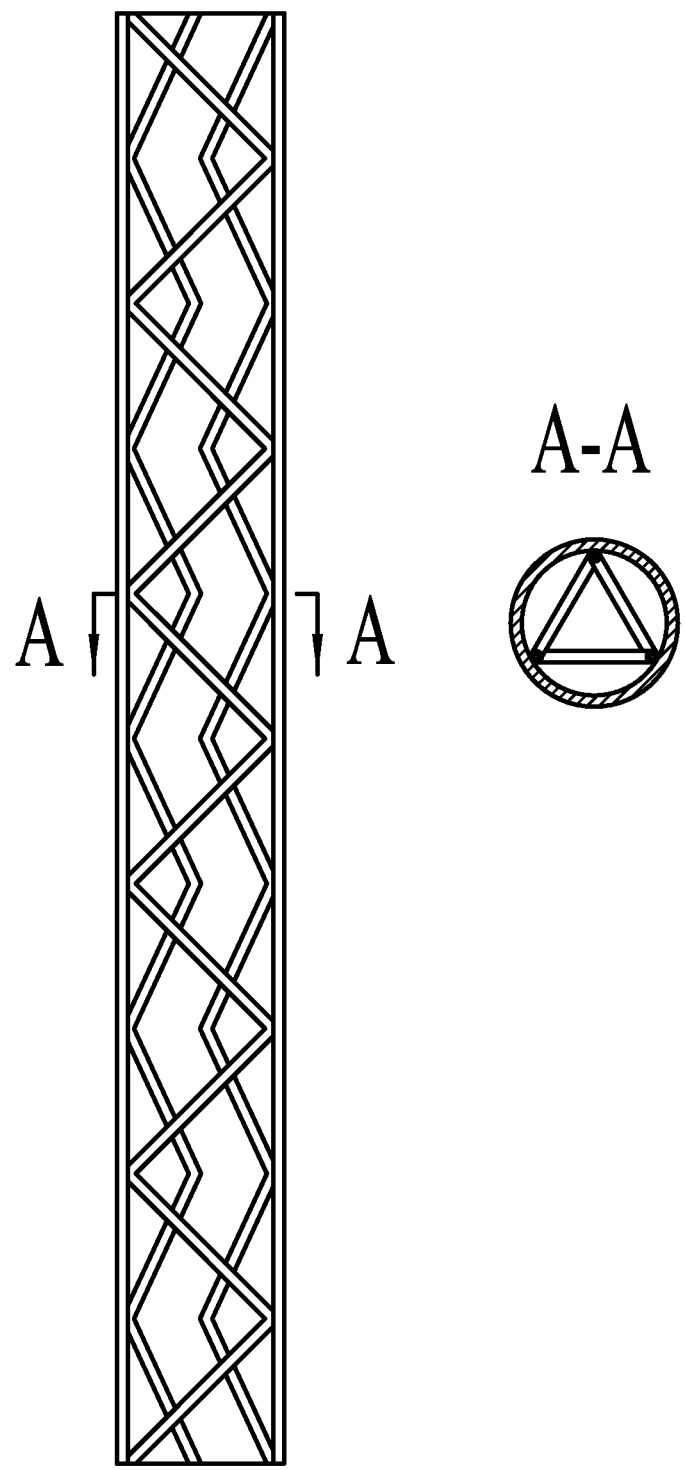
FIGS. 4 and 5 show a schematic diagram of a vertical central axis according to one embodiment of the invention.
Figure 6:
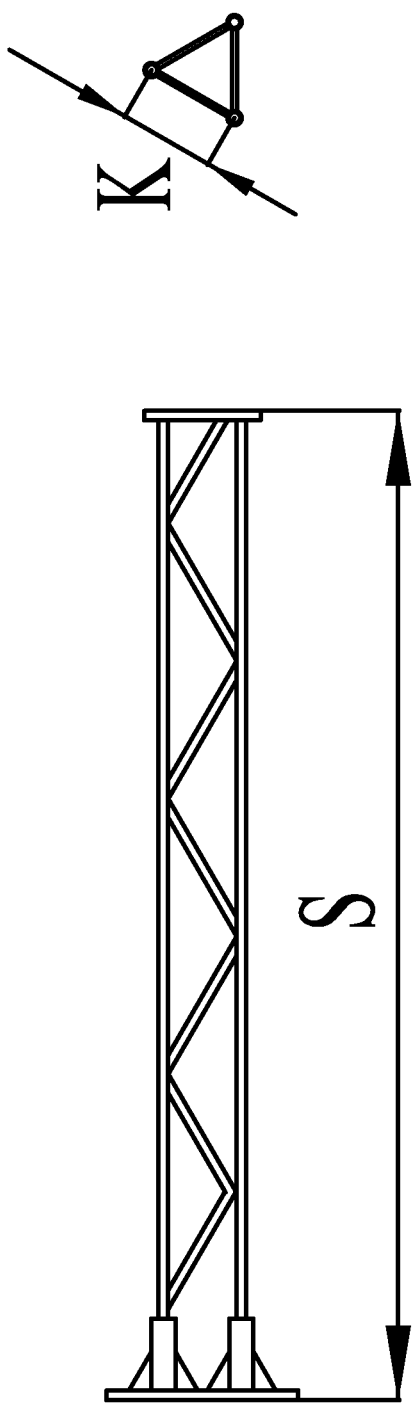
FIG. 6 shows a schematic diagram of a supporting arm according to one embodiment of the invention.

As shown in FIG. 2, a support for a large vertical axis wind turbine comprises a tower frame 1, a platform 2, a vertical central axis 4, and a vertical axis windmill comprising a plurality of blades 6 and supporting arms 5. The platform 2 is disposed on the tower frame 1 for installing and fixing a generator. A plurality of parts 3, such as a generator, connector, brake, transmission, and gear box, are disposed under the platform 2. As shown in FIG. 3, the tower frame 1 is a truss structure and comprises three hollow sub-tower frames which are in parallel with each other and form a regular polygon from top view. As shown in FIG. 4, the vertical central axis 4 is hollow and comprises a truss structure therein. The truss structure extends homogeneously from the bottom to the top. As shown in FIG. 6, the supporting arm 5 is a truss structure.

Example 2

A support for a large vertical axis wind turbine is the same as that disclosed in Example 1 except that the truss structure in the vertical central axis 4 extends heterogeneously from the bottom to the top, with a high density at the bottom and a low density on the top.

Example 3

Figure 5:
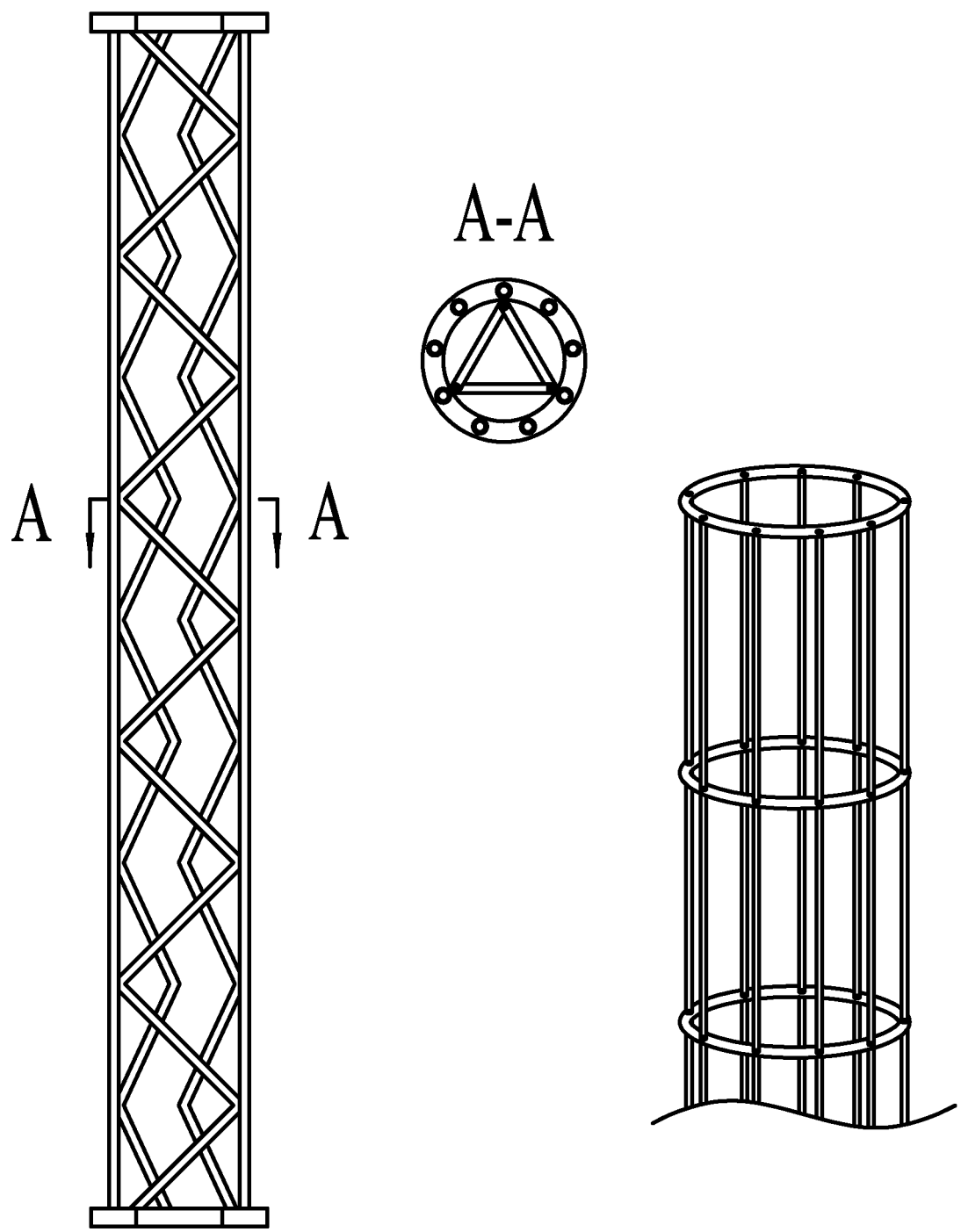

As shown in FIG. 5, a support for a large vertical axis wind turbine is the same as that disclosed in Example 1 except that the wall of the vertical central axis 4 comprises a circle comprising a plurality of round tubes at intervals.

Example 4

A support for a large vertical axis wind turbine is the same as that disclosed in Example 1 except that the tower frame 1 comprises four hollow sub-tower frames which are in parallel with each other and form a regular tetragon from top view.

Example 5

A support for a large vertical axis wind turbine is the same as that disclosed in Example 1 except that the tower frame 1 comprises five hollow sub-tower frames which are in parallel with each other and form a regular pentagon from top view.

Example 6

A 50 kW VAWT comprises a support of the invention. Based on the following designs of the support, the steel consumption thereof is calculated.

Assuming the windmill is 11 m in diameter (D) and 10 m in height, with an acceptable safe wind velocity of 60 m/s (no damage to the wind turbine in such wind velocity), when the tower frame of the wind turbine is 22 m in height (H), i.e., D/H=0.5, the distance (L) between two adjacent sub-tower frames is 4 m, i.e., D/L=2.75. The steel consumption of the tower frame is 4.1 t.

Assuming the windmill is 11 m in diameter (D) and 10 m in height, with an acceptable safe wind velocity of 60 m/s (no damage to the wind turbine in such wind velocity), when the tower frame of the wind turbine is 11.5 m in height (H), i.e., D/H=0.96, the distance (L) between two adjacent sub-tower frames is 3 m, i.e., D/L=3.67. The steel consumption of the tower frame is 1.74 t.

Assuming the windmill is 80 m in diameter (D) and 43 m in height, with an acceptable safe wind velocity of 60 m/s (no damage to the wind turbine in such wind velocity), when the tower frame of the wind turbine is 30 m in height (H), i.e., D/H=2.67, the distance (L) between two adjacent sub-tower frames is 15 m, i.e., D/L=5.33. The steel consumption of the tower frame is 72.3 t.

Thus, controlling D/L=2.5-6 and D/H=3-0.5 saves material consumption and reduces production cost meanwhile satisfying the requirement for structural safety.

If a supporting arm length (S) is 5 m and adjacent truss space (K) is 0.3 m, i.e., S/K=16.67, the steel consumption thereof is 85 kg. If adjacent truss space (K) is 0.2 m, i.e., S/K=25, the steel consumption thereof is 118 kg. If adjacent truss space (K) is 0.38 m, i.e., S/K=13.2, the steel consumption thereof is 77 kg.

Thus, controlling S/K=13-25 saves material consumption and reduces production cost meanwhile satisfying the requirement for structural safety.

Example 7

In this example, the application effect of a central axis of the invention is compared with that of a conventional thick-walled hollow axis and solid axis.

Assuming the windmill is 50 m in diameter (D) and 40 m in height, with an acceptable safe wind velocity of 60 m/s (no damage to the wind turbine in such wind velocity), and the central axis is 25 m in length. If the central axis of the invention is employed, the diameter thereof is 1.2 m, the wall thickness thereof is 30 mm, and the weight thereof is approx. 30 t. If a thick-walled hollow axis is employed, the diameter thereof is equal to or greater than 1.7 m, the wall thickness thereof is 30 mm, and the weight thereof is approx. 31 t. If a solid central axis is employed, the diameter thereof is 870 mm and the weight thereof is approx. 117 t, with a decreased rigidity.

Assuming the windmill is 80 m in diameter (D) and 43 m in height, with an acceptable safe wind velocity of 60 m/s (no damage to the wind turbine in such wind velocity), and the central axis is 25 m in length. If the central axis of the invention is employed, the diameter thereof is 1.5 m, the wall thickness thereof is 30 mm, and the weight thereof is approx. 38 t. If a thick-walled hollow axis is employed, the diameter thereof is equal to or greater than 2.16 m, the wall thickness thereof is 30 mm, and the weight thereof is approx. 40 t. If a solid central axis is employed, the diameter thereof is 1,022 mm and the weight thereof is approx. 161 t, with a decreased rigidity.

Therefore, the weight of the central axis of the invention is greatly reduced in contrast to that of the solid axis; the diameter of the central axis of the invention greatly is greatly reduced in contrast to that of the thick-walled hollow axis.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A large vertical axis wind turbine comprising:
   a tower frame, said tower frame being a truss structure and comprising at least 3 sub-tower frames in parallel with each other and forming a polygon from a top view,
   a platform disposed on the tower frame for installing and fixing a generator,
   a vertical central axis supported on the tower frame, said vertical central axis being hollow with a truss structure disposed therein, and
   a vertical axis windmill supported on the tower frame, the vertical axis windmill comprising supporting arms for supporting a plurality of blades of the vertical axis wind turbine,
   wherein said supporting arms of said vertical axis windmill are rotatable around said vertical central axis; each of said sub-tower frames is a hollow tube; a ratio of a diameter of said vertical axis windmill to a distance between two adjacent sub-tower frames is between 2.5 and 6; and a ratio of the diameter of said vertical axis windmill to a height of said tower frame is between 3 and 0.5, and
   wherein said truss structure in said vertical central axis extends heterogeneously from the bottom to the top, said truss structure at the bottom has a high density and said truss structure on the top has a low density.

2. The large vertical axis wind turbine of claim 1, wherein said tower frame comprises three sub-tower frames which form a regular triangle from the top view.

3. The large vertical axis wind turbine of claim 1, wherein said supporting arms are a truss structure and a ratio of a length of said supporting arms to a space between two adjacent trusses is between 13 and 25.

4. The large vertical axis wind turbine of claim 1, further comprising
   a generator, and
   optionally a connector, a brake, a transmission, or a gear box,
   wherein the generator, connector, brake, transmission, and gear box are disposed under said platform.

5. A large vertical axis wind turbine comprising:
   a tower frame, said tower frame being a truss structure and comprising at least 3 sub-tower frames in parallel with each other and forming a polygon from a top view,
   a platform disposed on the tower frame for installing and fixing a generator,
   a vertical central axis supported on the tower frame, said vertical central axis being hollow with a truss structure disposed therein, and
   a vertical axis windmill supported on the tower frame, the vertical axis windmill comprising supporting arms for supporting a plurality of blades of the vertical axis wind turbine,
   wherein said supporting arms of said vertical axis windmill are rotatable around said vertical central axis; each of said sub-tower frames is a hollow tube; a ratio of a diameter of said vertical axis windmill to a distance between two adjacent sub-tower frames is between 2.5 and 6; and a ratio of the diameter of said vertical axis windmill to a height of said tower frame is between 3 and 0.5, and
   wherein said vertical central axis comprises a plurality of round tubes at intervals which form a circle defining a circumference of said vertical central axis.

6. The large vertical axis wind turbine of claim 5, wherein said tower frame comprises three sub-tower frames which form a regular triangle from the top view.

7. The large vertical axis wind turbine of claim 5, wherein said supporting arms are a truss structure and a ratio of a length of said supporting arms to a space between two adjacent trusses is between 13 and 25.

8. The large vertical axis wind turbine of claim 5, further comprising
   a generator, and
   optionally a connector, a brake, a transmission, or a gear box,
   wherein the generator, connector, brake, transmission, and gear box are disposed under said platform.

* * * * *